May 11, 1937.  R. BERKOWITZ  2,079,598
GASOLINE HOSE
Filed Jan. 19, 1933
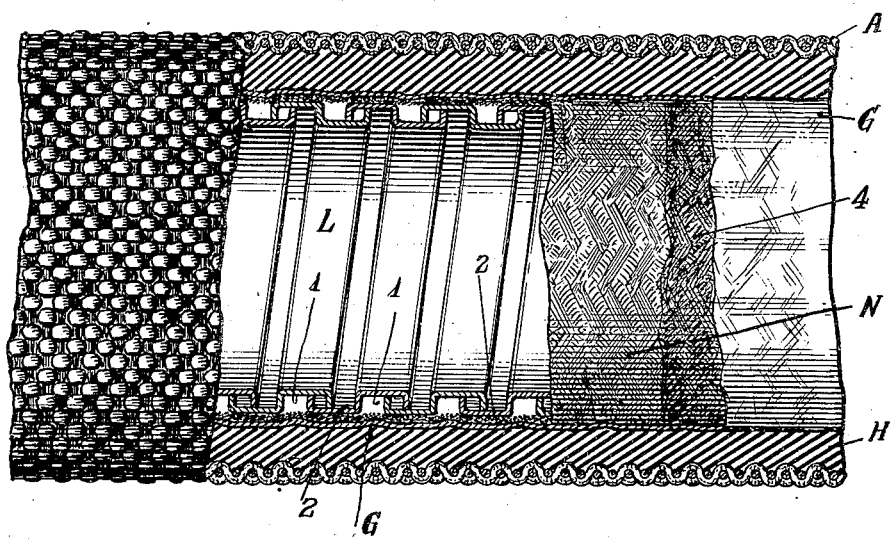
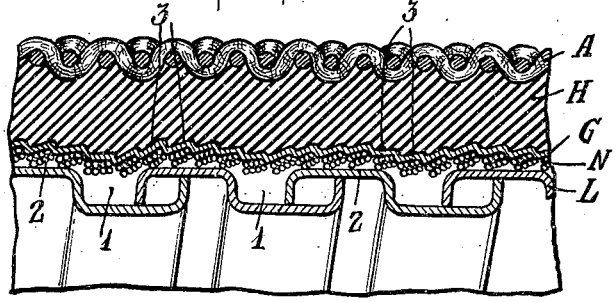
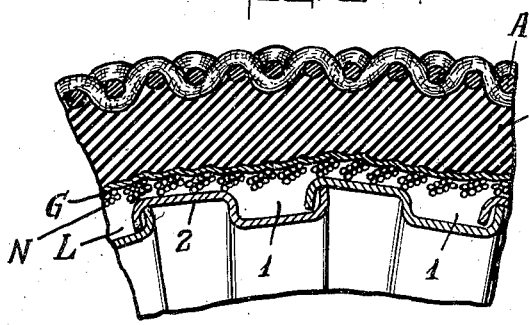
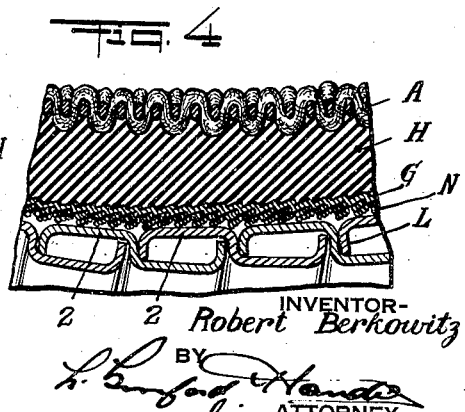
INVENTOR-
Robert Berkowitz
BY
ATTORNEY- Patented May 11, 1937

2,079,598

UNITED STATES PATENT OFFICE 2,079,598

GASOLINE HOSE

Robert Berkowitz, Brooklyn, N. Y., assignor to Metal Hose & Tubing Co. Inc., Brooklyn, N. Y., a corporation of New York Application January 19, 1933, Serial No. 652,460

8 Claims. (Cl. 138—58)

This invention relates to improvements in gasoline hose and method of manufacturing such hose, the same being in the nature of an improvement upon the hose disclosed in patent issued to John M. Oden, April 29, 1930, No. 1,756,698.

An object of the present invention is to provide a hose of this type which will be more efficient and more durable and more practical than heretofore.

A more specific object is to provide a gasoline proof hose which will be more easily flexible than heretofore.

A further specific object is to provide a gasoline proof hose including in its construction a cylindrical layer or sheath of gasoline proof material which is of such character, and which is in such relationship to the other elements of the construction, as to be highly efficient and durable in the performance of its function of preventing migration of gasoline to portions of the hose likely to be injured by the gasoline, and as to offer little or no resistance to the easy flexing of the hose.

A further detailed object is to so construct the hose that it will include an efficient protecting element or guard interposed between the gasoline proof layer and the metallic lining of the hose of such character as to efficiently protect the gasoline proof layer from being injured by the parts of the metallic liner during flexing of the hose.

A further detailed object is to so construct the protecting element just mentioned as to co-operate with the gasoline proof layer in giving form to the gasoline proof layer suitable for increasing the life period of the gasoline proof layer.

A further object is to so construct the hose that the gasoline proof layer or sheath may consist of cellophane.

A further object is to so construct the hose that it will carry a quantity of preservative for the material of the gasoline proof layer or sheath.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a transverse sectional view, partly in elevation, of a piece of hose embodying the features of this invention.

Fig. 2 is an enlarged fragmentary sectional view of a portion of the hose as appearing in Fig. 1.

Fig. 3 is a view similar to Fig. 2 but showing the condition of the parts in a stretched condition as on the convexed side of a bent hose, and Fig. 4 is a view similar to Fig. 3 but showing the condition of the parts in a condensed condition as on the concaved side of a bent hose.

Referring to the drawing for describing in detail the structure which is illustrated therein, the reference character L indicates the metallic liner such as is commonly employed in this type of hose. The reference character G indicates the gasoline proof layer or sheath. The reference character H indicates the rubber covering which is applied over the gasoline proof sheath G. The reference character A indicates the outer woven fabric covering which is applied over the rubber covering H. And the reference character N indicates the protecting element or guard which surrounds the metallic liner between the outer surface of the metallic liner and the inner surface of the gasoline proof sheath G.

The liner L may be of any approved construction, that illustrated being of the well known standard type made from a single strip of thin sheet metal bent into S cross section and spiral form and having its convolutions overlapping and interlocked. This metallic liner, as well as practically all other forms of metallic liners usable in this connection, is of such construction that the exterior thereof presents a helically corrugated annular surface the ridges of which move freely toward and away from each other whenever the hose is flexed, as will be readily understood by anyone familiar with flexible metallic tubes of this general character.

The rubber covering H may be of any desired consistency and thickness.

The outer fabric covering A preferably consists of coarse woven fabric or canvas being preferably woven directly about the rubber covering H, and being amply flexible and elastic to readily accommodate the bending or flexing movements of the hose. In the operation of applying it a sufficient tension is given to its component strands so that it operates to compress the rubber toward the metallic liner.

This fabric covering provides a suitably strong and tough protecting armor for the exterior surface of the hose, and yet one which is suitably elastic and flexible to accommodate the flexing movements of the hose in the manner as graphically illuminated by comparison of the illustrations Figs. 2, 3 and 4.

The protecting element or guard N is formed preferably of fabric, and may be of a braided type as indicated, or of a woven type if preferred. It is preferably of a somewhat finer texture however than the fabric covering A, the component strands being of smaller diameter than the component strand of the covering A. It is also preferably somewhat softer than the fabric A so that it offers a more resilient cushion between the gasoline proof layer G and the metallic surface of the liner.

This guard element N is amply flexible and elastic to readily accommodate the bending and flexing movements of the hose and is yet sufficiently stiff and substantial to prevent any appreciable sinking or sagging of its component parts into the grooves as 1—1 of the liner. It merely bridges from ridge to ridge along the liner and acts as a resilient support for the gasoline proof layer G across said grooves.

The outer annular surface of this guard N is not smooth, but is suitably rough to provide ridge-like formations as 3—3 uniformly distributed thereon into and over which the gasoline proof layer G may sink and fit.

The gasoline proof layer or sheath G consists of a cellulose composition such as "cellophane". It is only of sufficient thickness to afford ample bulk and body for convenient handling and for offering the requisite efficiency against penetration of gasoline therethrough, being in practice usually something less than one-sixteenth inch thick. When originally placed in position about the guard fabric N it is preferably in a relatively soft plastic and, in a sense, uncured condition loosely surrounding the guard N, but it shrinks as it dries and in the finished hose it closely hugs the guard N sinking into and about the depressions and ridges of the guard N so as to have a cross sectional contour following substantially the outer surface contour of said guard N, as clearly indicated in the drawing Fig. 2.

The sheath G is preferably, though not necessarily, formed as a complete tubular element prior to its application and when in this form is slid or telescoped over the hose.

The material of the sheath G in the finished hose is flexible and wrinkled so that it is capable of being extended, as on the convexed side of a bent hose as in Fig. 3, or condensed, as on the concaved side of a bent hose as in Fig. 4.

It is particularly to be noted with respect to the illustrations Figs 2, 3 and 4:

First, that the guard N is longitudinally elastic particularly across the grooves 1—1 of the hose so that when the ridges of the hose are spaced apart as in Figs. 2 and 3, said guard bridges across the grooves 1—1 and supports the sheath G and the rubber against sinking into said grooves.

Second, that by reason of its elasticity and other qualities as described the guard N maintains its position out of the grooves 1 at all times and is not pinched between the side walls of said groove 1 at the concaved side of a bent hose as illustrated in Fig. 4.

Third, that by reason of the elastic character of the material of the sheath G, and the transversely corrugated cross sectional contour of said material following the outer surface contour of the guard N, the sheath G is readily capable of extending as in Fig. 3 or of condensing as in Fig. 4 longitudinally of the hose whenever the hose is bent one way or the other. The ridges and depressions formed in the material of the sheath G, by the contact of said material with the exterior surface of the guard N, define a multitude of uniformly distributed and independently bendable sections as 3—3 throughout the extent of the sheath said sections merely straightening out with respect to each other to provide the required increased length in the desired direction when the hose is flexed one way as in Fig. 3, and crowding together to reduce length when the hose is flexed the opposite way as in Fig. 4.

A suitable softening agency as indicated at 4, is introduced into the structure intended for preserving the flexibility and elasticity both of the guard N and the gasoline proof sheath G, and for at the same time providing a lubricant between said guard N and the metallic exterior surface of the metallic liner so that the ridges of the liner may more easily slide and move along the opposing surface portions of the guard N. Any desired softening agency may be employed, such for instance as glycerine, and it may be applied in any suitable manner as for instance by being carried by the threads of the guard N, having been applied to said guard either after its application onto the metallic liner L or at the time of its application, the material of the guard being in any case substantially saturated with the softening agency so that the portion of said softening agency which is at the inner surface of the guard N contacts and provides a lubricant against the metallic surface of the liner, and the portion which is at the exterior surface of the guard N contacts the material of the sheath G to constitute both a lubricant and a preservant for the material of said sheath G suitable to materially prolong the life of said sheath.

The material of the sheath G may be given the substantially corrugated cross sectional contour, as indicated in Fig. 2, partly by shrinkage, but this contour is also, and preferably principally, caused by the squeezing effect of the canvas covering A and the rubber covering H against the sheath G thereby to a suitable extent crinkling the material of said sheath G into very close fitting contour with the surface of the guard N, and thus making the material of the sheath G readily capable of the requisite amount of elongation as in Fig. 3 without undue stretching of the component adjacent parts of said sheath at any point.

The rubber covering H is applied preferably by being formed, as by exuding, directly upon and about the outer surface of the tube G.

The metallic liner L is pervious but the sheath G is an impermeable barrier between the rubber covering and the gasoline or other solvent hydrocarbon fluid contained within the interior of the hose.

The metallic liner at all times serves to reinforce the hose against collapse from external pressure and against acute flexing, and thus guards the sheath G against damaging strains.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A gasoline hose comprising a flexible pervious metallic liner, a rubber cover therefor, a flexible sheath interposed betwen the liner and the cover proof against the passage therethrough of solvent hydro-carbon fluid, and a cushion member surrounding the metallic liner interposed betwen the liner and the inner surface of said sheath.

2. A gasoline hose comprising a flexible pervious metallic liner, a rubber cover therefor, a flexible sheath interposed between the liner and the cover proof against the passage therethrough of solvent hydro-carbon fluid, a tubular cushion surrounding the metallic liner interposed between the liner and the inner surface of said sheath, and said sheath consisting of a tube of cellophane surrounding said tubular cushion.

3. A gasoline hose comprising a flexible pervious metallic liner, a rubber cover therefor, a flexible sheath interposed between the liner and the cover proof against the passage therethrough of solvent hydro-carbon fluid, a tubular member surrounding the metallic liner interposed between the liner and the inner surface of said sheath, said tubular member having a rough exterior surface, and said sheath by pressure of said rubber cover being given a cross sectional contour corresponding to the surface contour of said tubular member whereby said sheath is made extensible under flexing movements of the the hose.

4. A gasoline hose comprising a flexible pervious metallic liner, a rubber cover therefor, a flexible sheath interposed between the liner and the cover proof against the passage therethrough of solvent hydro-carbon fluid, a tubular member surrounding the metallic liner interposed between the liner and the inner surface of the sheath, said tubular member having a rough exterior surface, said sheath consisting of a tube of cellophane surrounding said rough surface tubular member and being of a cross sectional contour corresponding and fitting to said rough surface whereby said sheath is extensible under flexing movements of the hose.

5. A gasoline hose comprising a flexible pervious metallic liner having external ridges movable relative to each other incident to flexing of the hose, a rubber cover for said liner, a flexible sheath interposed between the liner and the cover proof against the passage therethrough of solvent hydro-carbon fluid, and a tubular guard member surrounding the metallic liner interposed between the liner and the inner surface of said sheath, said guard member being elastic and constituting means bridging the spaces between the ridges of the liner to hold the sheath against sinking into said spaces.

6. A gasoline hose comprising a flexible pervious metallic liner having external ridges movable relative to each other incident to flexing of the hose, a rubber cover for said liner, a flexible sheath interposed between the liner and the cover proof against the passage therethrough of solvent hydro-carbon fluid, a tubular guard member surrounding the metallic liner interposed between the liner and the inner surface of said sheath, said guard member being elastic and constituting means bridging the spaces between the ridges of the liner to hold the sheath against sinking into said spaces, and said guard member including a preservation for the material of said sheath and a lubricant between itself and the ridges of the liner.

7. A gasoline hose comprising a relatively outer tubular layer of rubber and a relatively inner tubular layer of cellophane impervious to the passage of solvent hydro-carbon fluid outwardly therethrough to the rubber, and a tubular layer within said layer of cellophane constituting a guard for the layer of cellophane carrying a quantity of preservation in contact with the layer of cellophane to preserve the cellophane.

8. A gasoline hose comprising a flexible pervious metallic liner, a rubber cover therefor, a flexible sheath interposed between the liner and the cover proof against the passage therethrough of solvent hydro-carbon fluid, a tubular member surrounding the metallic liner interposed between the liner and the inner surface of said sheath, and a quantity of preservation for the material of said sheath carried by said tubular member in contact with the sheath.

ROBERT BERKOWITZ.